(12) United States Patent
Su et al.

(10) Patent No.: US 11,019,356 B2
(45) Date of Patent: May 25, 2021

(54) MOTION ESTIMATION METHOD AND DEVICE

(71) Applicant: SZ DJI TECHNOLOGY CO., LTD., Shenzhen (CN)

(72) Inventors: Wenyi Su, Shenzhen (CN); Liang Zhao, Shenzhen (CN); Lei Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/738,253

(22) Filed: Jan. 9, 2020

(65) Prior Publication Data
US 2020/0154129 A1 May 14, 2020

Related U.S. Application Data

(63) Continuation of application No. PCT/CN2017/108677, filed on Oct. 31, 2017.

(51) Int. Cl.
*H04N 19/513* (2014.01)
*H04N 19/172* (2014.01)
*H04N 19/423* (2014.01)
*H04N 19/527* (2014.01)
*H04N 19/53* (2014.01)

(52) U.S. Cl.
CPC ......... *H04N 19/513* (2014.11); *H04N 19/172* (2014.11); *H04N 19/423* (2014.11); *H04N 19/527* (2014.11); *H04N 19/53* (2014.11)

(58) Field of Classification Search
CPC .... H04N 19/513; H04N 19/527; H04N 19/53; H04N 19/521
See application file for complete search history.

(56) References Cited

U.S. PATENT DOCUMENTS

| 6,594,397 | B1 * | 7/2003 | Hu | H04N 19/56 |
| | | | | 375/240 |
| 8,149,911 | B1 * | 4/2012 | Alvarez | G06T 7/20 |
| | | | | 375/240.12 |
| 9,305,362 | B1 * | 4/2016 | Szedo | G06T 7/13 |
| 2008/0117968 | A1 * | 5/2008 | Wang | H04N 19/61 |
| | | | | 375/240.12 |

(Continued)

FOREIGN PATENT DOCUMENTS

| CN | 1554194 A | 12/2004 |
| CN | 1925617 A | 3/2007 |

(Continued)

OTHER PUBLICATIONS

The World Intellectual Property Organization (WIPO) International Search Report for PCT/CN2017/108677 dated Aug. 15, 2018 6 pages.

(Continued)

*Primary Examiner* — Jeremiah C Hallenbeck-Huber
(74) *Attorney, Agent, or Firm* — Anova Law Group, PLLC

(57) ABSTRACT

Motion estimation method and motion estimation device are provided. The method includes: determining a global motion vector of a current frame relative to a current reference frame according to the current frame and the current reference frame; and performing motion estimation on a target frame according to the global motion vector.

16 Claims, 6 Drawing Sheets

(56) References Cited

U.S. PATENT DOCUMENTS

| | | | | |
|---|---|---|---|---|
| 2008/0159400 | A1* | 7/2008 | Lee | H04N 19/19 375/240.16 |
| 2011/0091122 | A1* | 4/2011 | Park | H04N 19/56 382/239 |
| 2011/0134315 | A1* | 6/2011 | Levy | H04N 7/0127 348/441 |
| 2012/0218442 | A1* | 8/2012 | Jandhyala | G06T 5/50 348/239 |
| 2012/0263227 | A1* | 10/2012 | Kudana | H04N 19/56 375/240.02 |
| 2013/0033612 | A1* | 2/2013 | Wu | G06T 5/002 348/208.6 |
| 2015/0084970 | A1* | 3/2015 | Schaub | H04N 19/436 345/506 |
| 2016/0127678 | A1* | 5/2016 | Zhang | H04N 19/527 348/441 |
| 2016/0267325 | A1* | 9/2016 | Sundaresan | G06K 9/00624 |
| 2016/0291917 | A1* | 10/2016 | Hu | H04N 5/2624 |

FOREIGN PATENT DOCUMENTS

| | | |
|---|---|---|
| CN | 101411181 A | 4/2009 |
| EP | 2052553 A2 | 4/2009 |

OTHER PUBLICATIONS

Ying-Juan Li, et al., Fast Sub-pixel Global Motion Estimation Based on Phase Correlation, Fire Control & Command Control, vol. 41, No. 7, Jul. 15, 2016, pp. 148-151, China.

* cited by examiner

MOTION ESTIMATION METHOD AND DEVICE

CROSS-REFERENCE TO RELATED APPLICATION

This application is a continuation of International Application No. PCT/CN2017/108677, filed at Oct. 31, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of imaging processing and, more particularly, to a motion estimation method and a device.

BACKGROUND

In a field of image processing such as video coding, image time-domain noise reduction, and video self-adaptive frame rate, motion estimation is an important technology. Accuracy of the motion estimation directly affects the final effect of these image processing algorithms. As technologies develop, video resolution continuously increases. If a motion of the video sequence is severe, a magnitude of a motion vector in the motion estimation is inevitably increased. When estimating motion, a large search area is necessary to guarantee an efficient compression of a high-resolution video.

In a line buffer (LB) architecture, a large search area requires a static random access memory (SRAM) with higher complexity and a high hardware area. In a cache memory (Cache) architecture, a probability that the Cache misses the data increases as a motion vector increases. Missing data needs to be read from a double data rate (DDR) synchronous dynamic random access memory (SDRAM). A problem with increased read bandwidth is evitable.

SUMMARY

One aspect of the present disclosure provides a motion estimation method. The method includes determining a global motion vector of a current frame relative to a current reference frame, according to the current frame and the current reference frame; and performing a motion estimation on a target frame according to the global motion vector.

Another aspect of the present disclosure provides a motion estimation device. The device includes a processor, configured for determining a global motion vector of a current frame relative to a current reference frame, according to the current frame and the current reference frame; and performing a motion estimation on a target frame according to the global motion vector.

Another aspect of the present disclosure provides a computing device, including a motion estimation device. The motion estimation device includes a processor, configured for determining a global motion vector of a current frame relative to a current reference frame, according to the current frame and the current reference frame; and performing a motion estimation on a target frame according to the global motion vector.

In the present disclosure, the global motion vector of the current frame relative to the current reference frame, that is, an overall offset may be pre-calculated. Correspondingly, the global motion vector can be used as a reference when performing the motion estimation on the target frame on which the motion estimation is to be performed. The overall complexity in the motion estimation may be reduced.

Other aspects or embodiments of the present disclosure can be understood by those skilled in the art in light of the description, the claims, and the drawings of the present disclosure.

DETAILED DESCRIPTION OF THE EMBODIMENTS

Reference will now be made in detail to exemplary embodiments of the disclosure, which are illustrated in the accompanying drawings. Wherever possible, the same reference numbers will be used throughout the drawings to refer to the same or like parts.

Example embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Figure 1:
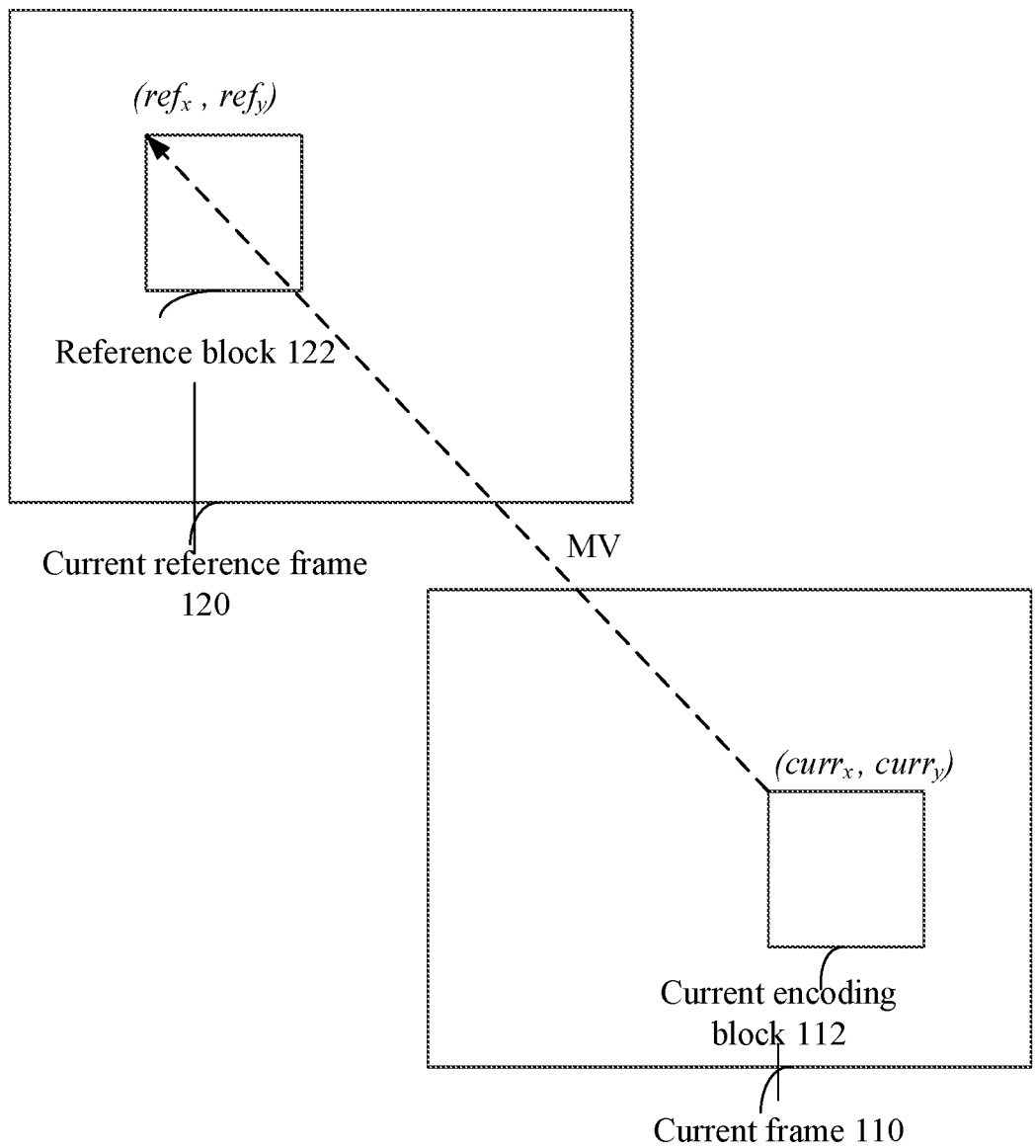
FIG. 1 illustrates a schematic of a motion estimation.

Interframe predictive encoding is an important method for reducing interframe redundancy in video encoding. In the interframe predictive encoding, for a current encoding block in a current frame, it is necessary to search for a best matching block (that is, a reference block) in a reference frame (that is, a current reference frame) of the current frame. This searching process is referred to as motion estimation. FIG. 1 illustrates the concept of motion estimation. As illustrated in FIG. 1, for the current encoding block 112 in the current frame 110, the reference block 122 may be achieved by searching the current reference frame 120. The code of the current encoding block 112 may be predicted according to the best matching block (the reference block) 122. A decoder only needs to know an encoder prediction residual and an offset between the current encoding block and the reference block. The offset between the current encoding block and the reference block is referred to as a motion vector (MV).

A coordination of a pixel at a left upper corner in the current encoding block 112 is referred to as ($curr_x$, $curr_y$), and a coordination of a pixel at a left upper corner in the reference block is referred to as ($ref_x$, $ref_y$). Correspondingly, the motion vector is given by $$mv_x = ref_x - curr_x;$$

$$mv_y = ref_y - curr_y.$$

The present disclosure provides a motion estimation method and a motion estimation device, which can be applied to related technologies of image processing and/or video processing, for example, software or hardware video encoding, image or video time domain noise reduction, or video adaptive frame rate.

Figure 2:
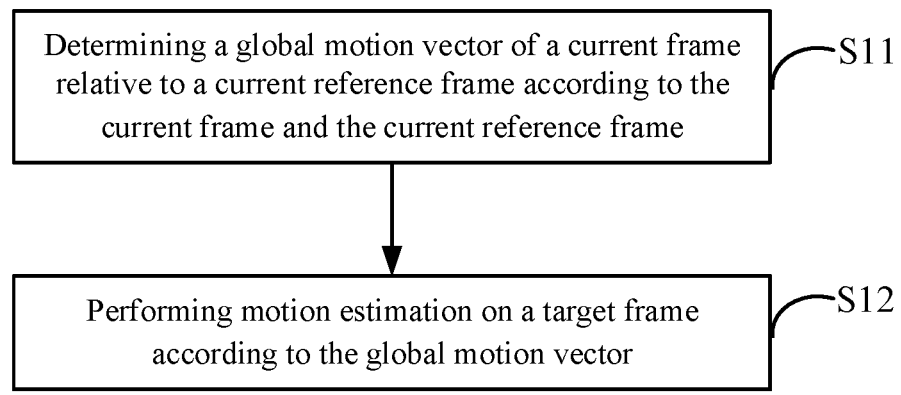
FIG. 2 illustrates an exemplary motion estimation method consistent with various embodiment of the present disclosure.

The present disclosure provides a motion estimation method. As illustrated in FIG. 2, in one embodiment, the motion estimation method 10 may include:

S11: determining a global motion vector (GMV) of a current frame relative to a current reference frame according to the current frame and the current reference frame; and S12: performing motion estimation on a target frame according to the global motion vector.

In the present disclosure, the global motion vector of the current frame relative to the current reference frame, that is, an overall offset, may be pre-calculated. Correspondingly, the global motion vector can be used as a reference when performing the motion estimation on the target frame on which the motion estimation is to be performed. Overall complexity in the motion estimation may be reduced.

In various embodiments, the current reference frame may include one or more frames. In one embodiment, the current reference frame may include a plurality of frames, and the current frame may have one global motion vector with respect to each frame of the current reference frame. The global motion vector of the current frame relative to the current reference frame may be a maximum vector of the plurality of global motion vectors, an average of the plurality of global motion vectors, or a weighted average of the plurality of global motion vectors.

In one embodiment, when the current frame is a frame at time t, the target frame on which the motion estimation is to be performed may be the current frame (the frame at time t). In another embodiment, the target frame may be a frame after the current frame (for example, a frame at time t+Δt), that is, the target frame may be a next frame or a frame after the next frame of the current frame. In another embodiment, the target frame may be a frame before the current frame (for example, a frame at time t-Δt). After the global motion vector is calculated, it can be applied to one target frame or a plurality of target frames. The present disclosure has no limit on this.

In one embodiment, performing motion estimation on the target frame according to the global motion vector may include: determining a searching area of the target reference frame corresponding to the to-be-estimated block in the target frame according to the global motion vector; and performing motion estimation on the to-be-estimated block in the searching area.

When performing the motion estimation on the target frame, besides the global motion vector of the current frame relative to the current reference frame, other global motion vectors may also be used as the reference. For example, the global motion vector of the frame at time t and a global motion vector of the frame at time t-Δt, the global motion vector of the frame at time t and a global motion vector of the frame at time t-2Δt, the global motion vector of the frame at time t-Δt and the global motion vector of the frame at time t-2Δt, or other global motion vectors of one or more frames, may be used as the reference. The present disclosure has no limit on this.

Figure 3:
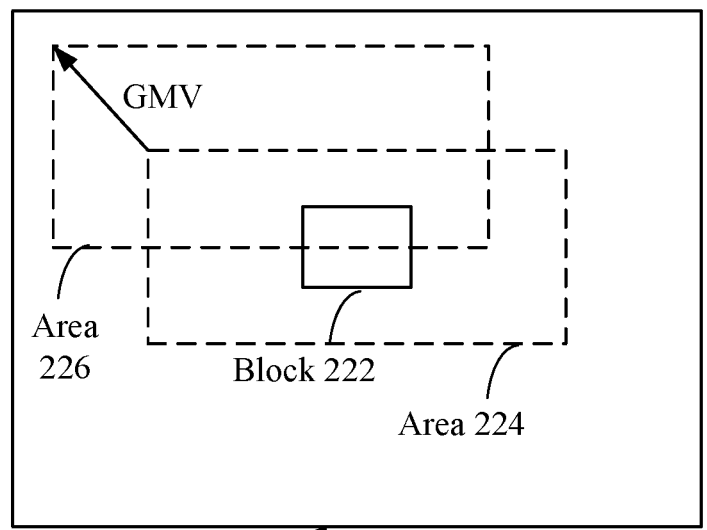
FIG. 3 illustrates a schematic of an exemplary motion estimation method consistent with various embodiment of the present disclosure.
Figure 3:
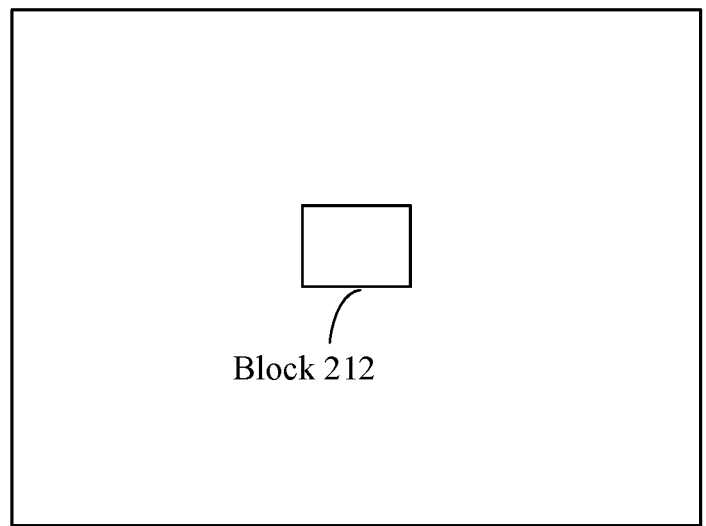

As illustrated in FIG. 3 where the target frame 210 and the reference frame corresponding to the target frame 210 (that is, the target reference frame 220) are used as an example, the target frame 210 and the target reference frame 220 may be divided into a plurality of blocks using a same division manner. The to-be-estimated block in the target frame 210 may be the block 212 as illustrated in FIG. 3. In an existing technology, when performing the motion estimation, the searching area in the target reference frame 220 may be an area 224 centered at a block 222 in the target reference frame 220 corresponding to the block 212. In the present disclosure, the searching area may be an area 226 that references the global motion vector, for example, the area 226 may be the region 224 plus the global motion vector (for example, a coordinate of a pixel at an upper left corner in the region 226 may be a coordinate of a pixel at an upper left corner in the region 224 plus the global motion vector). When performing the motion estimation in the region 226 on the to-be-estimated block, the probability and efficiency of finding the motion vector in the region 226 may be significantly increased, and the complexity of the motion estimation algorithm may be reduced. When the motion vector is large, using the motion estimation method in the embodiment may obtain the motion vector in a relatively small searching area.

For description purposes only, the embodiment where the searching area is determined by the method shown in FIG. 3 is used as an example to illustrate the present disclosure, and should not limit the scopes of the present disclosure. In various embodiments of the present disclosure, the searching area may be determined by any suitable methods based on the global motion vector.

In one embodiment, a size of the area 226 in the target reference frame 220 may be determined according to a magnitude of the global motion vector. For example, the area 226 may be larger when the global motion vector is larger and may be smaller when the global motion vector is small. The present disclosure has no limits on this.

In one embodiment, the searching area may be stored by a line buffer architecture. In comparison with the existing technologies, demand on the hardware area may be reduced. In some other embodiments, the searching area may be stored by a cache memory architecture. In comparison with the existing technologies, a hit rate may be increased and a problem of increased read bandwidth may be avoided. For description purposed only, the above embodiments where the searching area is stored by the line buffer architecture or the cache memory architecture are used as examples to illustrate the present disclosure and should not limit the scopes of the present disclosure.

In one embodiment, the motion estimation method may not only calculate the global motion vector based on an entire frame, but also divide a frame into several sub-images to calculate a global motion vector of each sub-image. That is, the global motion vector may be a global motion vector of a sub-image of the current frame divided according to a preset rule.

Figure 4:
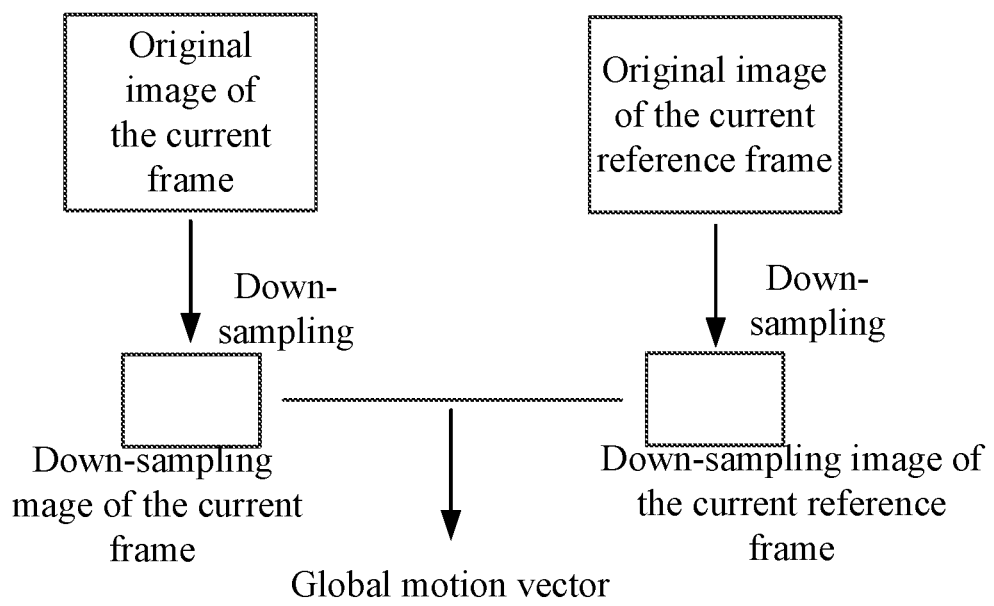
FIG. 4 illustrates an exemplary method to determine a global motion vector consistent with various embodiment of the present disclosure.

FIG. 4 illustrates an exemplary method to determine a global motion vector. As illustrated in FIG. 4, in one embodiment, the motion estimation method may further include: down-sampling an original image of the current frame to obtain a down-sampling image of the current frame; determining a down-sampling image of the current reference frame corresponding to the current frame; and determining the global motion vector of the original image of the current frame relative to an original image of the current reference frame according to the down-sampling image of the current frame and the down-sampling image of the current reference frame.

Since the global motion vector may have a large coverage and a requirement on the accuracy of the global motion vector may be not high, the calculation of the global motion vector may be performed from a low-resolution image to reduce the computational complexity. For example, the global motion vector may be determined based on the down-sampling image of the current frame and the down-sampling image of the current reference frame. For description purposed only, the embodiment in FIG. 4 where the global motion vector may be determined based on the down-sampling image of the current frame and the down-sampling image of the current reference frame is used as an example to illustrate the present disclosure and should not limit the scopes of the present disclosure. In some other embodiments, the global motion vector may be determined based on the original images instead of the down-sampling images.

In one embodiment, a down-sampling image may be obtained by a classic down-sampling method after low-pass filtering. In some other embodiments, a down-sampling image may be obtained by a direct-averaging method. In other embodiments, a down-sampling image may be obtained by other down-sampling algorithms.

In one embodiment, the original image of the current frame may be down-sampled to obtain the down-sampling image of the current frame. The original image of the current frame may be down-sampled by eight times in a horizontal and vertical directions respectively, and correspondingly, the line buffer data that needs to be saved for the down-sampled image may be only 1/64 of the original image. A data at a coordination (i,j) of the down-sampling image may be referred to as $d_{i,j}$, and a data at a coordination (i,j) of the original image may be referred to as $S_{k,l}$. Correspondingly, $d_{i,j}=(\Sigma_{k=8*i}^{8*i+7}\Sigma_{l=8*j}^{8*j+7}S_{k,l}+32)/64$.

The original image of the current reference frame may be down-sampled to obtain the down-sampling image of the current reference frame in a similar way. If the down-sampling image of the current frame (the frame at the time t) can be used as the down-sampling image of the reference frame relative to the frame at the time t+Δt, the down-sampling image of the current frame (the frame at the time t) may be stored in a double data rate SDRAM (DDR SDRAM) to be used as reference data for calculating the global motion vector of a next frame.

In one embodiment, determining the global motion vector of the original image of the current frame relative to an original image of the current reference frame according to the down-sampling image of the current frame and the down-sampling image of the current reference frame may include: determining at least one target block in the down-sampling image of the current frame; calculating a motion vector of each target block with respect to the down-sampling image of the current reference frame; determining the global motion vector of the original image of the current frame relative to an original image of the current reference frame according to the at least one motion vector. That is, the target blocks may be selected from the down-sampling image of the current frame according to a preset rule, and a motion vector of each target block with respect to the down-sampling image of the current reference frame may be calculated. Correspondingly, the global motion vector of the original image of the current frame relative to an original image of the current reference frame may be determined.

In various embodiments, the preset rule to select the target block from the down-sampling image of the current frame may be a random selection or a selection based on a preset algorithm. In one embodiment, selecting the at least one target block in the down-sampling image of the current frame, and calculating a motion vector of each target block with respect to the down-sampling image of the current reference frame may include: dividing the down-sampling image of the current frame into the at least target block according to a preset size, and calculating a motion vector of each target block with respect to the down-sampling image of the current reference frame.

In one embodiment, the down-sampling image of the current frame may be divided into non-overlapping small blocks which are referred to as target blocks ds_curr. For example, in one embodiment, the down-sampling image of the current frame may be divided into the target blocks by 8×8, using a simplest full search implemented by a hardware. In other embodiments, the down-sampling image of the current frame may be divided by using other dividing method. The down-sampling image of the current reference frame may be divided by a similar way to get the blocks ds_ref.

In one embodiment, calculating a motion vector of each target block with respect to the down-sampling image of the current reference frame may include: searching a matching block of the target block in a searching range with a preset size in the down-sampling image of the current reference frame; and calculating the motion vector of the target block with respect to the down-sampling image of the current reference frame according to a coordinate of the target block and a coordinate of the matching block. The size of the searching range may be equal to or different from the size of the searching area in the motion estimation, and the present disclosure has no limits on this.

For a target block ds_curr, a coordinate of a center of ds_curr may be (0, 0), and a coordinate of a same position in the down-sampling image of the current reference frame may be (0, 0). The search range in the down-sampling image of the current reference frame may be centered at (0, 0) and may have as size of 2M*2N with $x \in [-M,+M]$ and $y \in [-N,+N]$. The matching block of the target block ds_curr may be determined in this search range to determine the motion vector of the target block with respect to the down-sampling image of the current reference frame. In one embodiment, M may be 16 and N may be 8. The present disclosure has no limits on the value of M and the value of N.

After determining the motion vector of each target block, the global motion vector of the original image of the current frame relative to the original image of the current reference frame may be determined according to at least one motion vector. In one embodiment, the motion vector of all the target blocks may be statistically calculated to determine the global motion vector of the original image of the current frame relative to the original image of the current reference frame. In some other embodiments, the motion vector of the target blocks that meet a preset condition may be statistically calculated to determine the global motion vector of the original image of the current frame relative to the original image of the current reference frame. The preset condition may be a condition based on the pixel information.

In one embodiment, an intra-frame difference intra_activity of each target block may be calculated. The intra-frame difference intra_activity may be a sum of absolute values of the differences between the pixel values of all pixels in the target block and an average pixel value dc of the target block, as given by:

$$dc = (\Sigma_{i=0}^{7} \Sigma_{j=0}^{7} ds\_curr_{i,j} + 32)/64,$$

$$intra\_activity = \Sigma_{i=0}^{7} \Sigma_{j=0}^{7} abs(ds\_curr_{i,j} - dc),$$

where $ds\_curr_{i,j}$ is a pixel value of a pixel point with a coordinate (i,j), and abs(x) is an absolute value function. The intra-frame difference intra_activity may be small when the difference between the pixel values in the target block (that is, the target block is a flat area).

In one embodiment, the preset condition may be that the intra-frame difference of the target block is larger than a first threshold. The intra-frame difference intra_activity may be a sum of absolute values of the differences between the pixel values of all pixels in the target block and an average pixel value dc of the target block. The first threshold may be referred to as $thres\_hold_a$. The preset condition may be represented as $intra\_activity > thres\_hold_a$.

The first threshold $thres\_hold_a$ for a 8-bit video data may be a value between 400~800. In one embodiment, the first threshold $thres\_hold_a$ may be about 500.

For description purposes only, the above embodiment is used as an example to illustrate the present disclosure and should not limit the scopes of the present disclosure. In various embodiments, the intra-frame difference may be calculated by any suitable methods.

In one embodiment, a matching error between the target block and the matching block, that is, a ratio between an inter-frame difference inter_activity and the intra-frame difference intra_activity, may be calculated. The matching block may be a block in the down-sampling image of the current reference frame that has a smallest matching error relative to the target block. All of the blocks ds_ref in the search range of the down-sampling image of the current reference frame may be sequentially scanned according to a row-first criterion and the matching error SAD of the blocks ds_ref relative to the target block ds_curr may be calculated. A candidate block with a smallest SAD may be used as an optimal matching block, and the smallest SAD may be used as the inter-frame difference inter_activity. An offset of the optimal matching block ds_ref relative to the target block ds_curr may be the motion vector mv_best of the target block ds_curr. SAD may be given by $SAD = \Sigma_{i=0}^{7} \Sigma_{j=0}^{7} abs(ds\_ref_{i,j} - ds\_curr_{i,j})$.

In another embodiment, the preset condition may be that the ratio between the inter-frame difference inter_activity and the intra-frame difference intra_activity is smaller than a second threshold. The second threshold may be referred to as β, and correspondingly the preset condition may be $inter\_activity < \beta*intra\_activity$.

The second threshold β may be a value between about 0.5 to about 2.0. In one embodiment, the second threshold β may be about 1.0.

In some other embodiments, any other suitable methods may be used to calculate the matching error between the target block and the matching block. The present disclosure has no limit on this.

In one embodiment, the preset condition may include $intra\_activity > thres\_hold_a$ and $inter\_activity < \beta*intra\_activity$, that is, only the motion vector of the target blocks satisfying these two conditions may be used to calculate the global motion vector.

Based on above preset condition, the global motion vector may be determined by averaging. An x-axis variable may be referred to as $gmv\_sum_x$, a y-axis variable may be referred to as $gmv\_sum_y$, and a variable of a number of the selected blocks may be referred to as cand_sum. The variables $gmv\_sum_x$, $gmv\_sum_y$, and cand_sum may be given an initial value 0, that is $gmv\_sum_x = 0;$ $gmv\_sum_y = 0;$ and $cand\_sum = 0.$ A target block meeting the preset condition may be labelled as valid, and a target block that does not meet the preset condition may be labelled as invalid. An x-axis component of a motion vector of a valid target block may be $mv\_best_x$ and a y-axis component may be $mv\_best_y$. For each valid target block determined once, the variables $gmv\_sum_x$, $gmv\_sum_y$, and cand_sum may be accumulated, that is $gmv\_sum_x += mv\_best_x;$ $gmv\_sum_y += mv\_best_y;$ and $cand\_sum += 1.$ After going through all the target blocks, the final values of the variables $gmv\_sum_x$, $gmv\_sum_y$, and cand_sum may be obtained. The global motion vector may be determined according to the final values of the variables $gmv\_sum_x$, $gmv\_sum_y$, and cand_sum. The determined global motion vector may be a global motion vector with noise and may be referred to as $gmv\_noisy_t$. An x-axis component of $gmv\_noisy_t$ may be $gmv\_noisy_{t_x}$, and a y-axis component may be $gmv\_noisy_{t_y}$. $gmv\_noisy_{t_x}$ and $gmv\_noisy_{t_y}$ may be given by:

$$gmv\_noisy_{t_x} = (\gamma*gmv\_sum_x + cand\_sum/2)/cand\_sum;$$
and $$gmv\_noisy_{t_y} = (\gamma*gmv\_sum_y + cand\_sum/2)/cand\_sum,$$

where γ is a down-sampling rate of the down-sampling algorithm. In one embodiment, γ may be about 8.

In one embodiment, to obtain an optimal global motion vector, post-processing may be performed on the global motion vector with noise. For example, the global motion vector with noise may be temporally denoised or temporally filtered. That is, the global motion vector may be obtained by temporal filtering a global motion vector of each of a plurality of frames relative to a corresponding reference frame. In some other embodiments, an average value or a weight average value of a plurality of global motion vectors with noise may be calculated to determine the optimal global motion vector. The present disclosure has no limits on this. The plurality of frames here may include frames before the current frame and/or frames after the current frame. The plurality of frames may be two or more frames.

In one embodiment, the global motion vector gmv may be determined by performing the temporal filtering on the global motion vector with noise $gmv\_noisy_t$ of the current frame and the global motion vector with noise $gmv\_noisy_{t-1|t}$ of a frame before the current frame. An x-axis component $gmv_x$ of gmv and a y-axis component $gmv_y$ may be given by:

$$gmv_x = \frac{w0 * gmv\_noisy_{t_x} + w1 * gmv\_noisy_{t-1_x}}{w0 + w1}; \text{ and}$$

$$gmv_y = \frac{w0 * gmv\_noisy_{t_y} + w1 * gmv\_noisy_{t-1_y}}{w0 + w1},$$

where w0 and w1 are denoising parameters. In one embodiment, w0 and w1 may be 3 and 1 respectively. In other embodiments, w0 and w1 may have any other suitable values and the present disclosure has no limit on this.

For description purposes only, the above embodiments with the preset conditions and the selecting rules described above are used as examples to illustrate the present disclosure, and should not limit the scopes of the present disclosure. Different selecting rules and/or different preset conditions may induce difference in the calculation complexity and then difference in the accuracy of the final global motion vector.

Figure 5:
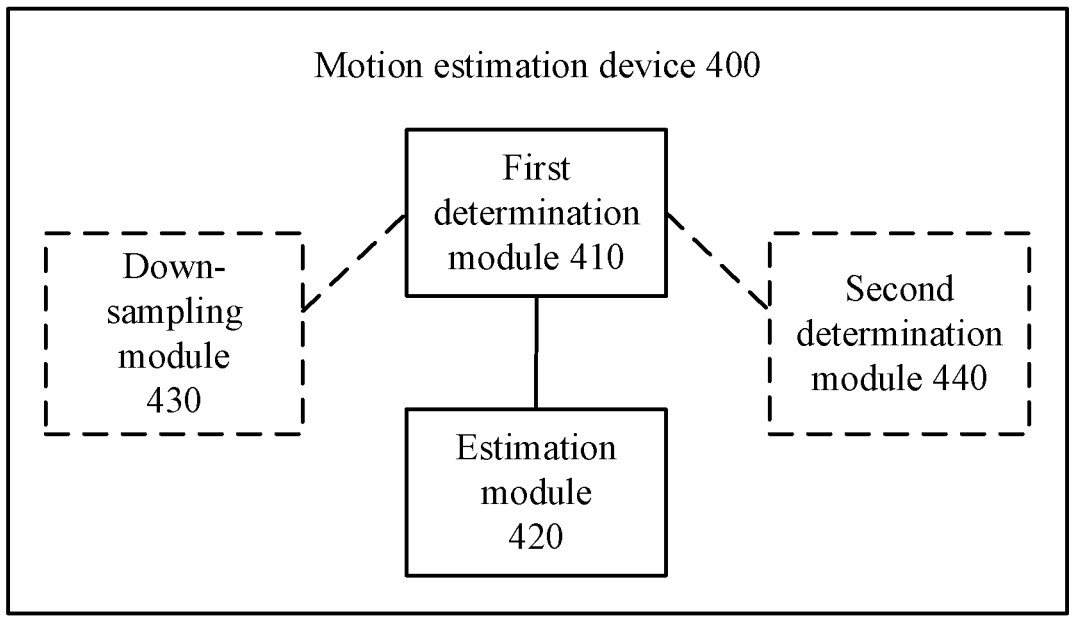
FIG. 5 illustrates an exemplary motion estimation device consistent with various embodiment of the present disclosure.

The present disclosure also provides a motion estimation device. As illustrated in FIG. 5, a motion estimation device 400 provided by one embodiment of the present disclosure may include a first determination module 410 and an estimation module 420. The first determination module 410 may determine a global motion vector of a current frame relative to a current reference frame, according to the current frame and the current reference frame. The estimation module 420 may perform motion estimation on the target frame according to the global motion vector determined by the first determination module 410.

In the present disclosure, the global motion vector of the current frame relative to the current reference frame, that is, an overall offset, may be pre-calculated. Correspondingly, the global motion vector can be used as a reference when performing the motion estimation on the target frame on which the motion estimation is to be performed. Overall complexity in the motion estimation may be reduced.

In one embodiment, a process that the estimation module 420 performs motion estimation on the target frame according to the global motion vector may include: the estimation module 420 determines a searching area of a target reference frame corresponding to the to-be-estimated block in a target frame according to the global motion vector and performs motion estimation on the to-be-estimated block in the searching area.

In one embodiment, the search area may be stored by a line buffer architecture. In some other embodiments, the search area may be stored by a cache memory architecture.

In one embodiment, the target frame may be the current frame or a frame after the current frame.

In one embodiment, the global motion vector may be a global motion vector of sub-images of the current frame divided by a preset rule.

In one embodiment, the motion estimation device 400 may further include a down-sampling module 430 and a second determination module 440. The down-sampling module 403 may down-sample an original image of the current frame to obtain a down-sampling image of the current frame. The second determination module 440 may determine a down-sampling image of the current reference frame relative to the current frame. A process that the first determination module 410 determines a global motion vector of the current frame relative to the current reference frame, according to the current frame and the current reference frame, may include: the first determination module 410 determines a global motion vector of the original image of the current frame relative to the original image of the current reference frame according to the down-sampling image of the current frame obtained by the down-sampling module 430 and the down-sampling image of the current reference frame determined by the second determination module 440.

In one embodiment, a process that the first determination module 410 determines the global motion vector of the original image of the current frame relative to the original image of the current reference frame according to the down-sampling image of the current frame obtained by the down-sampling module 430 and the down-sampling image of the current reference frame determined by the second determination module 440 may include: the first determination module 410 determines at least one target block in the down-sampling image of the current frame and calculates a motion vector of each target block with respect to the down-sampling image of the current reference frame; and the first determination module 410 determines the global motion vector of the original image of the current frame relative to an original image of the current reference frame according to the at least one motion vector.

In one embodiment, a process that the first determination module 410 calculates a motion vector of each target block with respect to the down-sampling image of the current reference frame may include: the first determination module 410 searches for a matching block of the target block in a searching range with a preset size in the down-sampling image of the current reference frame; and calculating the motion vector of the target block with respect to the down-sampling image of the current reference frame according to a coordinate of the target block and a coordinate of the matching block.

In one embodiment, a process that the first determination module 410 determines the at least one target block in the down-sampling image of the current frame and calculates a motion vector of each target block with respect to the down-sampling image of the current reference frame may include: the first determination module 410 divides the down-sampling image of the current frame into the at least target block according to a preset size, and calculates a motion vector of each target block with respect to the down-sampling image of the current reference frame.

In one embodiment, a process that the first determination module 410 determines the global motion vector of the original image of the current frame relative to an original image of the current reference frame according to the at least one motion vector may include: the first determination module 410 performs a statistical calculation on the motion vector of all the target blocks to determine the global motion vector of the original image of the current frame relative to the original image of the current reference frame.

In one embodiment, a process that the first determination module 410 determines the global motion vector of the original image of the current frame relative to an original image of the current reference frame according to the at least one motion vector may include: the first determination module 410 performs a statistical calculation on the motion vector of the target blocks that meet a preset condition to determine the global motion vector of the original image of the current frame relative to the original image of the current reference frame. The preset condition may be a condition based on the pixel information.

In one embodiment, the preset condition may be that the intra-frame difference of the target block is larger than a first threshold. The intra-frame difference may be a sum of absolute values of the differences between the pixel values of all pixels in the target block and an average pixel value dc of the target block.

In another embodiment, the preset condition may further include that the ratio between a matching error between the target block and the matching block and the intra-frame difference is smaller than a second threshold. The matching block may be a block in the down-sampling image of the current reference frame that has a smallest matching error relative to the target block. The intra-frame difference may be a sum of absolute values of the differences between the pixel values of all pixels in the target block and an average pixel value dc of the target block.

In one embodiment, the global motion vector may be determined by performing temporal filtering on a global motion vector of each frame among a plurality of frames with respect to a corresponding reference frame.

Figure 6:
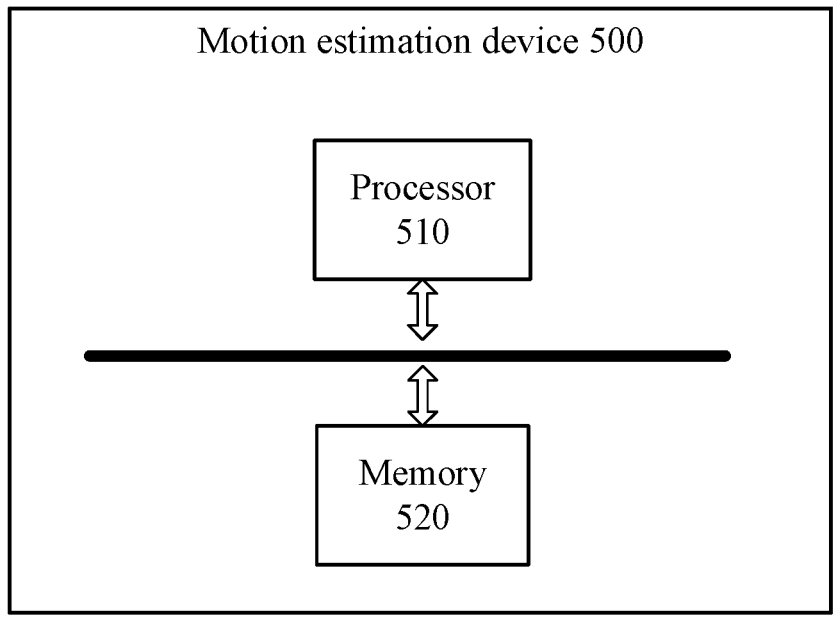
FIG. 6 illustrates another exemplary motion estimation device consistent with various embodiment of the present disclosure.

In various embodiments, the motion estimation device may be realized based on processors and memories. The memories may be configured to store commands for performing above motion estimation method provided by various embodiments of the present disclosure. The processors may be configured to execute the commands to make the device performing above motion estimation method. In one embodiment as illustrated in FIG. 6, another embodiment provides another motion estimation device 500 including a processor 510 and a memory 520.

In various embodiments of the present disclosure, the processor may be a central processing unit (CPU), a general-purpose processor, a digital signal processor (DSP), an application specific integrated circuit (ASIC), a field programmable gate array (FPGA) or another programmable logic device, a discrete gate/transistor logic device, or a discrete hardware component. A general-purpose processor may be a microprocessor or any conventional processor.

In various embodiments of the present disclosure, the memory may be a volatile memory, a non-volatile memory, or a combination thereof. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and may be used as an external cache. The RAM may be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a direct rambus random access memory (DRRAM). The above random access memories are used as examples to illustrate the present disclosure and should not limit the scopes of the present disclosure.

In one embodiment, when the processor is a general-purpose processor, a DSP, a ASIC, a FPGA or another programmable logic device, a discrete gate/transistor logic device, or a discrete hardware component, the memory (or the memory module) may be integrated in the processor.

The present disclosure also provides a computer-readable storage medium. The storage medium may be configured to store instructions. When the instructions are executed by the computer, the computer may perform above motion estimation methods provided by various embodiments of the present disclosure.

The present disclosure also provides a computing device including a computer-readable storage medium described above.

The present disclosure may be applied to aerial vehicle field, especially unmanned aerial vehicle field.

Figure 7:
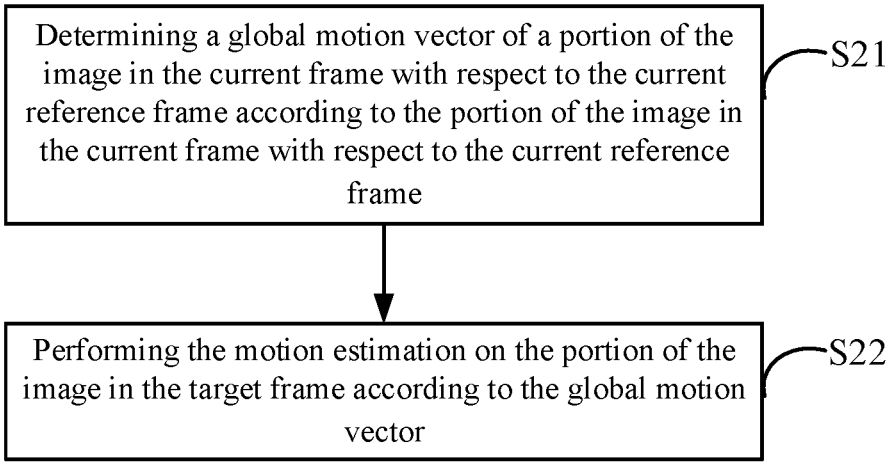
FIG. 7 illustrates another exemplary motion estimation method consistent with various embodiments of the present disclosure.

The present disclosure also provides another motion estimation method 20 illustrated in FIG. 7. The motion estimation method 20 may include: S21, determining a global motion vector of a portion of the image in the current frame with respect to the current reference frame according to the portion of the image in the current frame with respect to the current reference frame; and S22, performing the motion estimation on the portion of the image in the target frame according to the global motion vector.

In the present disclosure, the global motion vector of the portion of the image in the current frame relative to the current reference frame, that is, an overall offset, may be pre-calculated. Correspondingly, the global motion vector can be used as a reference when performing the motion estimation on the target frame on which the motion estimation is to be performed. Overall complexity in the motion estimation may be reduced.

The motion estimation may be only performed on a portion of the image in the current frame.

In one embodiment, S22 performing the motion estimation on the portion of the image in the target frame according to the global motion vector may include: determines a searching area of a target reference frame corresponding to the to-be-estimated portion of the image in the target frame according to the global motion vector and performs motion estimation on the to-be-estimated portion of the image in the searching area.

In one embodiment, the search area may be stored by a line buffer architecture. In some other embodiments, the search area may be stored by a cache memory architecture.

In one embodiment, the target frame may be the current frame or a frame after the current frame.

In one embodiment, the motion estimation method 20 may further include: down-sampling an original image of the portion of the image in the current frame to obtain a down-sampling image of the portion of the image in the current frame; determining a down-sampling image of the current reference frame corresponding to the current frame; and determining the global motion vector of the original image of the portion of the image in the current frame relative to an original image of the current reference frame according to the down-sampling image of the portion of the image in the current frame and the down-sampling image of the current reference frame.

In one embodiment, determining the global motion vector of the original image of the portion of the image in the current frame relative to the original image of the current reference frame according to the down-sampling image of the portion of the image in the current frame and the down-sampling image of the current reference frame may include: determining at least one target block in the down-sampling image of the portion of the image in the current frame; calculating a motion vector of each target block with respect to the down-sampling image of the current reference frame; determining the global motion vector of the original image of the portion of the image in the current frame relative to an original image of the current reference frame according to the at least one motion vector.

In one embodiment, calculating a motion vector of each target block with respect to the down-sampling image of the current reference frame may include: searching a matching block of the target block in a searching range with a preset size in the down-sampling image of the current reference frame; and calculating the motion vector of the target block with respect to the down-sampling image of the current reference frame according to a coordinate of the target block and a coordinate of the matching block.

In one embodiment, the at least one target block in the down-sampling image of the current frame and calculating a motion vector of each target block with respect to the down-sampling image of the current reference frame may include: dividing the down-sampling image of the portion of the image in the current frame into the at least target block according to a preset size, and calculating a motion vector of each target block with respect to the down-sampling image of the current reference frame.

In one embodiment, determining the global motion vector of the original image of the portion of the image in the current frame relative to an original image of the current reference frame according to the at least one motion vector may include: performing a statistical calculation on the motion vector of all the target blocks to determine the global motion vector of the original image of the portion of the image in the current frame relative to the original image of the current reference frame.

In one embodiment, determining the global motion vector of the original image of the portion of the image in the current frame relative to an original image of the current reference frame according to the at least one motion vector may include: performing a statistical calculation on the motion vector of the target blocks that meet a preset condition to determine the global motion vector of the original image of the portion of the image in the current frame relative to the original image of the current reference frame. The preset condition may be a condition based on the pixel information.

In one embodiment, the preset condition may be that the intra-frame difference of the target block is larger than a first threshold. The intra-frame difference may be a sum of absolute values of the differences between the pixel values of all pixels in the target block and an average pixel value dc of the target block.

In another embodiment, the preset condition may further include that the ratio between a matching error between the target block and the matching block and the intra-frame difference is smaller than a second threshold. The matching block may be a block in the down-sampling image of the current reference frame that has a smallest matching error relative to the target block. The intra-frame difference may be a sum of absolute values of the differences between the pixel values of all pixels in the target block and an average pixel value dc of the target block.

In one embodiment, the global motion vector may be determined by performing temporal filtering on a global motion vector of each frame among a plurality of frames with respect to a corresponding reference frame.

A difference between the method 20 and the method 10 in the present disclosure is that the method 20 may only calculate the global motion vector on a portion of the image in the current frame instead of the entire current frame. Correspondingly, the motion estimation may also only be performed on the portion of the image in the current frame.

The present disclosure also provides another motion estimation device. The motion estimation device may include a first determination module and an estimation module. The first determination module may determine a global motion vector of a portion of the image in a current frame relative to a current reference frame, according to the portion of the image in the current frame and the current reference frame. The estimation module may perform motion estimation on the portion of the image in the target frame according to the global motion vector determined by the first determination module 410.

In the present disclosure, the global motion vector of the portion of the image in the current frame relative to the current reference frame, that is, an overall offset, may be pre-calculated. Correspondingly, the global motion vector can be used as a reference when performing the motion estimation on the portion of the image in the target frame on which the motion estimation is to be performed. Overall complexity in the motion estimation may be reduced.

In one embodiment, a process that the estimation module performs motion estimation on the portion of the image in the target frame according to the global motion vector may include: the estimation module determines a searching area of a target reference frame corresponding to the to-be-estimated portion of the image in in a target frame according to the global motion vector and performs motion estimation on the to-be-estimated the portion of the image in the searching area.

In one embodiment, the search area may be stored by a line buffer architecture. In some other embodiments, the search area may be stored by a cache memory architecture.

In one embodiment, the target frame may be the current frame or a frame after the current frame.

In one embodiment, the global motion vector may be a global motion vector of sub-images of the current frame divided by a preset rule.

In one embodiment, the motion estimation device may further include a down-sampling module and a second determination module. The down-sampling module may down-sample an original image of the portion of the image in the current frame to obtain a down-sampling image of the portion of the image in the current frame. The second determination module may determine a down-sampling image of the current reference frame relative to the current frame. A process that the first determination module determines a global motion vector of the portion of the image in the current frame relative to the current reference frame, according to the portion of the image in the current frame and the current reference frame, may include: the first determination module determines a global motion vector of the original image of the portion of the image in the current frame relative to the original image of the current reference frame according to the down-sampling image of the portion of the image in the current frame obtained by the down-sampling module and the down-sampling image of the current reference frame determined by the second determination module.

In one embodiment, a process that the first determination module determines the global motion vector of the original image of the portion of the image in the current frame relative to the original image of the current reference frame according to the down-sampling image of the portion of the image in the current frame obtained by the down-sampling module and the down-sampling image of the current reference frame determined by the second determination module may include: the first determination module determines at least one target block in the down-sampling image of the portion of the image in the current frame and calculates a motion vector of each target block with respect to the down-sampling image of the current reference frame; and the first determination module determines the global motion vector of the original image of the portion of the image in the current frame relative to an original image of the current reference frame according to the at least one motion vector.

In one embodiment, a process that the first determination module calculates a motion vector of each target block with respect to the down-sampling image of the current reference frame may include: the first determination module searches for a matching block of the target block in a searching range with a preset size in the down-sampling image of the current reference frame; and calculating the motion vector of the target block with respect to the down-sampling image of the current reference frame according to a coordinate of the target block and a coordinate of the matching block.

In one embodiment, a process that the first determination module determines the at least one target block in the down-sampling image of the portion of the image in the current frame and calculates a motion vector of each target block with respect to the down-sampling image of the current reference frame may include: the first determination module divides the down-sampling image of the portion of the image in the current frame into the at least target block according to a preset size, and calculates a motion vector of each target block with respect to the down-sampling image of the current reference frame.

In one embodiment, a process that the first determination module determines the global motion vector of the original image of the portion of the image in the current frame relative to an original image of the current reference frame according to the at least one motion vector may include: the first determination module performs a statistical calculation on the motion vector of all the target blocks to determine the global motion vector of the original image of the current frame relative to the original image of the current reference frame.

In one embodiment, a process that the first determination module determines the global motion vector of the original image of the portion of the image in the current frame relative to an original image of the current reference frame according to the at least one motion vector may include: the first determination module performs a statistical calculation on the motion vector of the target blocks that meet a preset condition to determine the global motion vector of the original image of the current frame relative to the original image of the current reference frame. The preset condition may be a condition based on the pixel information.

In one embodiment, the preset condition may be that the intra-frame difference of the target block is larger than a first threshold. The intra-frame difference may be a sum of absolute values of the differences between the pixel values of all pixels in the target block and an average pixel value dc of the target block.

In another embodiment, the preset condition may further include that the ratio between a matching error between the target block and the matching block and the intra-frame difference is smaller than a second threshold. The matching block may be a block in the down-sampling image of the current reference frame that has a smallest matching error relative to the target block. The intra-frame difference may be a sum of absolute values of the differences between the pixel values of all pixels in the target block and an average pixel value dc of the target block.

In one embodiment, the global motion vector may be determined by performing temporal filtering on a global motion vector of each frame among a plurality of frames with respect to a corresponding reference frame.

In various embodiments, the motion estimation device may be realized based on processors and memories. The memories may be configured to store commands for performing above motion estimation method provided by various embodiments of the present disclosure. The processors may be configured to execute the commands to make the device performing above motion estimation method.

In various embodiments of the present disclosure, the processor may be a central processing unit (CPU), a general-purpose processor, a digital signal processor (DSP), an application specific integrated circuit (ASIC), a field programmable gate array (FPGA) or another programmable logic device, a discrete gate/transistor logic device, or a discrete hardware component. A general-purpose processor may be a microprocessor or any conventional processor.

In various embodiments of the present disclosure, the memory may be a volatile memory, a non-volatile memory, or a combination thereof. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and may be used as an external cache. The RAM may be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a direct rambus random access memory (DRRAM). The above random access memories are used as examples to illustrate the present disclosure and should not limit the scopes of the present disclosure.

In one embodiment, when the processor is a general-purpose processor, a DSP, a ASIC, a FPGA or another programmable logic device, a discrete gate/transistor logic device, or a discrete hardware component, the memory (or the memory module) may be integrated in the processor.

The present disclosure also provides a computer-readable storage medium. The storage medium may be configured to store instructions. When the instructions are executed by the computer, the computer may perform above motion estimation methods provided by various embodiments of the present disclosure.

The present disclosure also provides a computing device including a computer-readable storage medium described above.

The present disclosure may be applied to aerial vehicle field, especially unmanned aerial vehicle field.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A motion estimation method, including:
   down-sampling a current frame to obtain a down-sampling image of the current frame;
   determining a down-sampling image of a current reference frame corresponding to the current frame;
   determining a plurality of target blocks in the down-sampling image of the current frame and calculating a motion vector of each of the plurality of target blocks relative to the down-sampling image of the current reference frame;
   calculating an intra-frame difference for each of the plurality of target blocks, the intra-frame difference of one of the plurality of target blocks being a sum of absolute values of differences between pixel values of all pixels in the one of the plurality of target blocks and an average pixel value of the one of the plurality of target blocks;
   determining, for each of the plurality of target blocks, a matching block in the down-sampling image of the current reference frame;
   determining a matching error between each of the plurality of target blocks and a corresponding matching block;
   calculating, for each of the plurality of target blocks, a ratio between the matching error and the intra-frame difference;
   selecting, from the plurality of target blocks, one or more target blocks that satisfy a condition, the condition including the ratio being smaller than a threshold;
   performing a statistical calculation on motion vectors of the one or more selected target blocks to determine a global motion vector of the current frame relative to the current reference frame; and
   performing a motion estimation on a target frame according to the global motion vector.

2. The method according to claim 1, wherein performing the motion estimation on the target frame according to the global motion vector includes:
   determining a searching area in a target reference frame corresponding to a to-be-estimated block in the target frame according to the global motion vector; and
   performing the motion estimation on the to-be-estimated block in the searching area.

3. The method according to claim 2, wherein the searching area is stored using a line buffer architecture.

4. The method according to claim 2, wherein the searching area is stored using a cache memory architecture.

5. The method according to claim 1, wherein:
   the target frame is the current frame or a frame after the current frame.

6. The method according to claim 1, wherein:
   the global motion vector includes global motion vectors of sub-images of the current frame divided with a preset rule.

7. The method according to claim 1, wherein:
   determining the matching block includes searching, for each of the plurality of target blocks, the matching block in a searching range with a preset size in the down-sampling image of the current reference frame; and
   calculating the motion vector of each of the plurality of target blocks includes calculating the motion vector of each of the plurality of target blocks according to a coordinate of each of the plurality of target blocks and a coordinate of the corresponding matching block.

8. The method according to claim 1, wherein determining the plurality of blocks in the down-sampling image of the current frame includes:
   dividing the down-sampling image of the current frame into the plurality of target blocks according to a preset size.

9. The method according to claim 1, wherein:
   the threshold is a first threshold; and
   the condition further includes that the intra-frame difference of the target block is larger than a second threshold.

10. The method according to claim 1, wherein:
    the matching block of each of the plurality of target blocks is a block in the down-sampling image of the current reference frame that has a smallest matching error relative to the corresponding one of the plurality of target blocks.

11. The method according to claim 1, further comprising:
determining global motion vectors of a plurality of frames relative to a corresponding one of a pluraltity of references frames, the pluraltiy fo frames including the current frame, and the plurality of referencecs frames including the references frame; and
performing temporal filtering on the global motion vectors.

12. A motion estimation device, including:
a processor, configured for:
  down-sampling a current frame to obtain a down-sampling image of the current frame:
  determining a down-sampling image of a current reference frame corresponding to the current frame;
  determining a plurality of target blocks in the down-sampling image of the current frame and calculating a motion vector of each of the plurality of target blocks relative to the down-sampling image of the current reference frame;
  calculating an intra-frame difference for each of the plurality of target blocks, the intra-frame difference of one of the plurality of target blocks being a sum of absolute values of differences between pixel values of all pixels in the one of the plurality of target blocks and an average pixel value of the one of the plurality of target blocks;
  determining, for each of the plurality of target blocks, a matching block in the down-sampling image of the current reference frame;
  determining a matching error between each of the plurality of target blocks and a corresponding matching block;
  calculating, for each of the plurality of target blocks, a ratio between the matching error and the intra-frame difference;
  selecting, from the plurality of target blocks, one or more target blocks that satisfy a condition, the condition including the ratio being smaller than a threshold;
  performing a statistical calculation on motion vectors of the one or more selected target blocks to determine a global motion vector of the current frame relative to the current reference frame; and
  performing a motion estimation on a target frame according to the global motion vector.

13. The device according to claim 12, wherein:
the processor is further configured for:
  determining a searching area of a target reference frame corresponding to a to-be-estimated block in the target frame according to the global motion vector, and performing the motion estimation on the to-be-estimated block in the searching area.

14. The device according to claim 13, wherein the searching area is stored in a line buffer architecture.

15. The device according to claim 12, further comprising:
a memory, configured to store instructions, wherein the processor is configured to execute the instructions stored in the memory.

16. A computing device, comprising:
a motion estimation device, comprising a processor configured for:
  down-sampling a current frame to obtain a down-sampling image of the current frame:
  determining a down-sampling image of a current reference frame corresponding to the current frame;
  determining a plurality of target blocks in the down-sampling image of the current frame and calculating a motion vector of each of the plurality of target blocks relative to the down-sampling image of the current reference frame;
  calculating an intra-frame difference for each of the plurality of target blocks, the intra-frame difference of one of the plurality of target blocks being a sum of absolute values of differences between pixel values of all pixels in the one of the plurality of target blocks and an average pixel value of the one of the plurality of target blocks;
  determining, for each of the plurality of target blocks, a matching block in the down-sampling image of the current reference frame;
  determining a matching error between each of the plurality of target blocks and a corresponding matching block;
  calculating, for each of the plurality of target blocks, a ratio between the matching error and the intra-frame difference;
  selecting, from the plurality of target blocks, one or more target blocks that satisfy a condition, the condition including the ratio being smaller than a threshold;
  performing a statistical calculation on motion vectors of the one or more selected target blocks to determine a global motion vector of the current frame relative to the current reference frame; and
  performing a motion estimation on a target frame according to the global motion vector.

* * * * *